(12) United States Patent
Bovis

(10) Patent No.: US 8,958,853 B1
(45) Date of Patent: Feb. 17, 2015

(54) MOBILE DEVICE INACTIVE MODE AND INACTIVE MODE VERIFICATION

(71) Applicant: Nick Bovis, San Francisco, CA (US)

(72) Inventor: Nick Bovis, San Francisco, CA (US)

( * ) Notice: Subject to any disclaimer, the term of this patent is extended or adjusted under 35 U.S.C. 154(b) by 0 days.

(21) Appl. No.: 14/515,477

(22) Filed: Oct. 15, 2014

Related U.S. Application Data

(63) Continuation of application No. 14/176,107, filed on Feb. 9, 2014.

(60) Provisional application No. 61/835,234, filed on Jun. 14, 2013.

(51) Int. Cl.
  *H04M 1/00* (2006.01)
  *H04M 1/725* (2006.01)
  *H04W 4/14* (2009.01)
  *H04M 3/42* (2006.01)

(52) U.S. Cl.
  CPC ...... *H04M 1/72552* (2013.01); *H04M 1/72577* (2013.01); *H04W 4/14* (2013.01); *H04M 3/42374* (2013.01)
  USPC ..................................................... 455/569.2

(58) Field of Classification Search
  USPC ..................................................... 455/569.2
  See application file for complete search history.

(56) References Cited

U.S. PATENT DOCUMENTS

2005/0119002 A1* 6/2005 Bauchot et al. ............... 455/441
2011/0039581 A1* 2/2011 Cai et al. .................... 455/456.4

OTHER PUBLICATIONS

Layborn, Announcing our Third Windows Phone 8 Update—Plus a New Developer Preview Program, Blogging Windows, Oct. 14, 2013, http://blogs.windows.com/bloggingwindows/2013/10/14/announcing-our-third-windows-phone-8-update-plus-a-new-developer-preview-program/.
Tue, Stay Safe with Windows Phone Driving Mode, Microsoft Conversations, Jan. 21, 2014, http://conversations.nokia.com/2014/01/21/stay-safe-windows-phone-driving-mode/.
Nokia Lumia 1520—Set Your Phone to Driving Mode, Microsoft, http://www.microsoft.com/en-us/mobile/support/product/lumia1520/userguidance/?action=singleTopic&topic=GUID-9E1144DE-0101-4108-BFED-DF22C1B31E4C.

* cited by examiner

*Primary Examiner* — Joel Ajayi
(74) *Attorney, Agent, or Firm* — Richards Patent Law P.C.

(57) ABSTRACT

A mobile device, comprising: a processor; and a memory including instructions that when executed by the processor cause it to perform the steps of: receiving a user selection to automatically enter an inactive mode in response to an action within the mobile device indicating the device is being used in a moving vehicle; receiving a communication from a wireless communication module; if the mobile device is not in inactive mode, providing a notification to the user that a communication has been received; if the mobile device is in inactive mode, transmitting an away message via the wireless module.

9 Claims, 10 Drawing Sheets

MOBILE DEVICE INACTIVE MODE AND INACTIVE MODE VERIFICATION

CROSS-REFERENCE TO RELATED APPLICATIONS

This application incorporates by reference and claims priority to U.S. Non-provisional application Ser. No. 14/176,107 filed Feb. 9, 2014 and to U.S. Provisional Application No. 61/835,234 filed Jun. 14, 2013.

BACKGROUND OF THE INVENTION

The present subject matter relates generally to a mobile device including functionality for suppressing user notifications of communications received by the mobile device and notifying the sender of the communication that the user is not receiving communications. Further, the present subject matter relates generally to systems and methods for verifying that a user was not receiving communications during a particular period of time.

User distraction caused by mobile devices has become a serious problem in modern society. For example, motor vehicle accidents caused by distracted driving are on the rise and have become as serious as driving while intoxicated. Many drivers are aware of the risks of distracted driving but may lack the resolve to avoid trying to respond to incoming communications. One previous solution was to power down the mobile device while driving, however, this is inconvenient and easy to forget to initiate. Further, powering down the device may block access to urgent communications that may need to be received. What are needed are mechanisms to limit user communication distractions without forcing the user to power down a mobile device and miss essential communications.

Further, the proliferation of accidents cause by distracted driving has created a need to prove that one was not operating a communications device during operation of a vehicle. What are needed are mechanisms to show that a user was not using a communications device during an accident while operating a vehicle.

Accordingly, there is a need for a mobile device including functionality for suppressing communications to a user and systems for verifying that a user was not receiving communications during a particular period of time, as described herein.

BRIEF SUMMARY OF THE INVENTION

To meet the needs described above and others, the present disclosure provides a mobile device including functionality for suppressing communications to a user and systems for verifying that a user was not receiving communications during a particular period of time.

As used herein, a communication may include a mobile device call, SMS text message, email, application notification, etc. A sender includes an individual sending the communication.

An inactive mode for a mobile device as disclosed herein may be implemented using stored instructions that implement the functionality disclosed herein. In a preferred embodiment, the stored instructions may be provided in the form of a mobile device application. A user may install the mobile device application through a mobile device application online store.

A user may enable an inactive mode of the device to suppress notification of incoming phone calls, text, emails, etc. and automatically notify the sender with an away message. By suppressing the communications distracted driving may be reduced. One drawback, however, is that senders may feel upset that they are not being answered when the sender is expecting the user to reply. Thus, in order to reassure senders that they will receive a response at the earliest convenient opportunity, the mobile device permits the user to send an away message upon receipt of a communication.

Further, the device may communicate with a certification server to "certify" that a mobile device was not operational during a certain period as evidence that the phone was not used during driving. By enabling a user to show that he or she did not use mobile device during operation of a vehicle, he or she may be able to qualify for discounts from an insurance company or may be able to show he or she was not at fault in an accident. Further, parents may use such records to verify that teenage drivers are not being distracted by their mobile device.

In an embodiment, a method carried out by a mobile device to provide for an inactive mode and thus prevent distracted driving includes the steps of: placing the mobile device in inactive mode; detecting one or more incoming communications; suppressing notification of the user of the one or more incoming communications; transmitting an away message to one or more senders of the one or more communications; and notifying the user of missed communications upon completion of the inactive mode.

The method begins when the mobile device is placed in inactive mode. The inactive mode may be activated by many different mechanisms. For example, a user may press a button to begin the inactive mode. Alternatively, a user may schedule a time period during which the mobile device is automatically in inactive mode. Even further, inactive mode may be automatically initiated upon the use of a driving directions functionality of the mobile device. Yet even further, the inactive mode may be automatically initiated upon the pairing of the mobile device and a vehicle. Moreover, inactive mode may be activated by a remote user, for example, to enable parents to limit distracted driving by teenagers. Additionally, the inactive mode may be activated by the mobile device detecting a particular location using GPS, such as a gym or school, where inactive mode is routinely activated. It is contemplated that any input that indicates that the user is not to be distracted may be used to place the device in inactive mode, as will be understood by those of skill in the art.

While in inactive mode, the mobile device will detect incoming communications. When inactive mode functionality is provided as a mobile application, the mobile application may register with the operating system of the mobile device to receive a notification upon a communication event, such as a mobile call, SMS message, or email. Upon receipt of notification of the incoming communication, the mobile application may capture contact information of the sender, such as phone number or email address.

In addition to suppressing communications, inactive mode may restrict the user's use of the mobile device. For example, the user of the mobile device may be restricted from accessing a web browser on the mobile device. Inactive mode may restrict all use of the mobile device or may permit only selective access to needed functionality. For example, when driving, mapping and navigation functionality may remain accessible.

It is contemplated that the user may customize the allowed functionality during inactive mode. Alternatively or additionally, the restriction on the functionality may be pre-programmed in the device, for example, if the inactive mode functionality is embodied in a mobile application distributed by an insurance company, the restriction of functionality may be optimized to minimize distracted driving accidents. Further, a remote user may restrict the functionality of the device. For example, a parent may limit a child's use of a mobile device during nighttime sleeping hours.

Upon receiving notification of a communication event, the mobile device may suppress normal user notification. The mobile device may suppress normal user notification actions, such as ringing, vibration, and screen activation. Further the mobile device may suppress applications normally launched upon a communication event, such as a mobile call application. In some embodiments, the mobile device may permit normal user notification if the sender is on a pre-screened list of allowed senders.

After suppressing user notification, the mobile device may transmit an away message to the sender. The away message may be sent via the same medium that the original communication was made in. For example, if a text message was received, the mobile device may transmit a response via text message. Alternatively, the message may be sent by a different medium. For example, if a phone call was received, the mobile device may transmit the away message via text message or email (if, for example, the sender has an associated email address in the users contacts). It is further contemplated that the user's inactive mode away message may be automatically shared to social networks such Facebook and Twitter upon activation of the inactive mode.

The user may configure an away message before placing the mobile device in inactive mode. The user may configure multiple away messages and choose among the away messages when placing the mobile device in away mode.

At the appropriate time, the device may leave inactive mode and permit the user to use the full functionality of the device. In an embodiment, inactive mode may be disabled by pressing a button ending inactive mode. Alternatively, where inactive mode was scheduled to start automatically, the mobile device may leave inactive mode by reaching the end of a scheduled time. Further, where the mobile device was placed in inactive mode by the driving directions functionality, the mobile device may leave inactive mode by arriving at a destination. Even further, where the mobile device was placed in inactive mode remotely, the mobile device may be removed from inactive mode by remote deactivation, etc. It will be apparent to one of skill in the art that that the mobile device may be removed from inactive mode by any mechanism that reflects that the need for restricted access is no longer needed.

Upon completion of the inactive mode, the mobile device notifies user of missed communications. The user may then view any text messages or emails, or may listen to voicemails left by the sender.

As described, the device may "certify" or prove that a mobile device was not operational during a certain period as evidence that the phone was not used during driving. A method of proving a cell phone was disabled comprises the steps of: receiving an input by the mobile device to begin the inactive mode; transmitting an inactive mode begin notification from the mobile device to the certification server; receiving, by the certification server, an inactive mode begin notification; suppressing notifications to a user; receiving an input by the mobile device to end the inactive mode; transmitting an inactive mode end notification from the mobile device to the certification server; receiving an inactive mode end notification by the certification server; generating, by the certification server, a certified record of the time of the inactive mode begin notification and the inactive mode end notification.

The method of proving a cell phone was disabled may begin upon the mobile device being placed in inactive mode. As previously described, the mobile device may be placed in inactive mode by the user pressing a button to begin the inactive mode; by the user scheduling a time period during which the mobile device is automatically in inactive mode; by the use of the driving directions functionality of the mobile device; by activation by a remote user; etc.

Upon being placed in inactive mode, the mobile device may transmit an inactive mode begin notification to the server. The inactive mode begin notification may include a user identifier, and a begin timestamp indicating the time that the inactive mode was initiated. Further, the inactive mode begin notification may include a listing of functionality permissions to record the functionality made available and/or the functionality made restricted to the user during the inactive mode. It is contemplated that the mobile device need not immediately transmit the inactive mode begin notification upon the step of receiving an input to begin inactive mode is received, and the mobile device may alternatively transmit the inactive mode begin notification when requested, when a connection is available, during periods of low bandwidth utilization, or any other time useful to create the certification.

The certification server receives the inactive mode begin notification from the mobile device. The certification server may assume that inactive mode is operating continuously until receiving a signal, such as an inactive mode end notification, that inactive mode has been disabled. A certified record of the data contained in the inactive mode begin notification may be created and stored in a database of the certification server. The certified record may include a first timestamp of the time the inactive mode begin notification was received.

In inactive mode, the mobile device may suppress communications and enforce the restrictions of the inactive mode until the step of receiving an input to end inactive mode. As previously described, an input may be the user pressing a button to end the inactive mode, the user scheduling a time period during which the mobile device is automatically in inactive mode, the use of the driving directions functionality of the mobile device, activation by a remote user; etc.

At the conclusion of inactive mode, the mobile device may transmit an inactive mode end notification to the certification server to indicate that the device has left the inactive mode. The inactive mode end notification may include a user identifier and a end timestamp marking the time that the mobile device was removed from inactive mode. Further, the inactive mode end notification may include a listing of functionality permissions to record the functionality made available and/or the functionality made restricted to the user during the inactive mode. It is contemplated that the mobile device need not immediately transmit the inactive mode end notification upon the step of receiving an input to begin inactive mode is received, and the mobile device may transmit the inactive mode end notification when requested, when a connection is available, during periods of low bandwidth utilization, or any other time useful to create the certification.

The certification server may receive an inactive mode end notification from the mobile device. Upon receipt of the inactive mode end notification, the certification server may make a certified record of the inactive mode session. The certified record of the inactive mode session may include the inactive mode begin notification, an inactive mode begin notification arrival timestamp recording the arrival of the inactive mode begin notification, the inactive mode end notification, and an inactive mode end notification arrival timestamp recording the arrival of the inactive mode end notification. The record may be used to verify that the inactive mode was enabled during a period of time. To do so, the record may be made available via a user interface to the user, an insurance company, the police, the courts, a parent of the user, etc., to certify the times the device was in inactive mode and the restrictions on functionality in place during inactive mode.

In an embodiment, a mobile device includes: a processor; and a memory including instructions that when executed by the processor cause it to perform the steps of: receiving a user selection to automatically enter an inactive mode in response to an action within the mobile device indicating the device is being used in a moving vehicle; receiving a communication from a wireless communication module; if the mobile device is not in inactive mode, providing a notification to the user that a communication has been received; and if the mobile device is in inactive mode, transmitting an away message via the wireless module.

In some embodiments of the mobile device, the action is the activation of a driving directions functionality. In other embodiments, the action is GPS location functionality detecting a velocity above a certain rate. In additional embodiments, the action is pairing the mobile device with the moving vehicle.

In some embodiments of the mobile device, the communication is a mobile phone call. In other embodiments, the away message is one of a mobile phone call, an SMS message, or an email. In additional embodiments the communication is an SMS phone call. In further embodiments, the communication is an email.

In some embodiments of the mobile device, the memory further includes instructions that when executed by the processor cause it to perform the steps of: receiving an input from a user requesting access to a function of the mobile device; if the mobile device is not in inactive mode, providing access to the requested functionality; and if the mobile device is in inactive mode, checking if the requested functionality is present on a list of restricted functionality, and if the requested functionality is present on a list of restricted functionality, refusing access to the requested functionality.

One objective of the invention is to increase driver safety by reducing mobile device communications as a source of distraction.

A further objective is to inform callers of the delay and the reason for failing to respond.

Another objective of the invention is to provide a mechanism for users to prove that the communication functions of their mobile device were disabled at a particular time.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
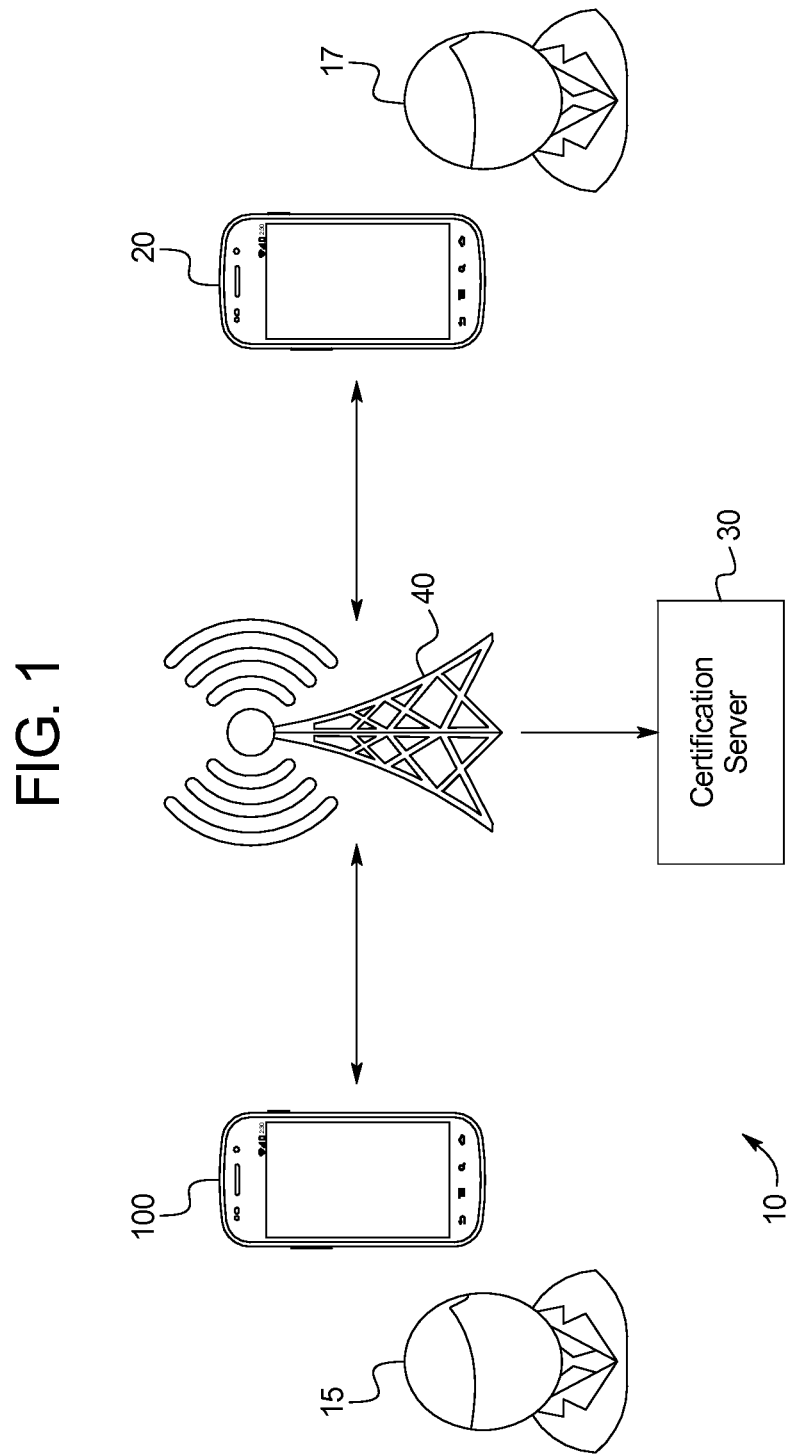
FIG. 1 is a schematic view of the ecosystem of a device including functionality for suppressing communications to a user using an inactive mode and a verification system to verify that a user was not receiving communications during a particular period of time.

FIG. 1 illustrates the ecosystem 10 of an example of a mobile device 100 including functionality for suppressing communications using an inactive mode. As shown in FIG. 1, the ecosystem 10 includes a communications network 40 which provides communications functionality to the mobile device 100, other communication devices 20 which other users may use to communicate to the mobile device 100, and a certification server 30 that may verify that a user 15 was not receiving communications during a particular period of time.

A user 15 may enable an inactive mode of the device 100 to suppress notification of incoming phone calls, text, emails, and other communications and automatically notify the device 20 of the sender 17 with an away message. By suppressing the incoming communications, the mobile device 100 may minimize user distractions permitting the user 15 to maintain concentration on important tasks, such as driving. One drawback, however, is that senders 17 may feel upset that they are not being answered when the sender 17 is expecting the user 15 to answer communications. Thus, in order to reassure senders 17 that their communication will receive a response at the earliest convenient opportunity, the mobile device 100 permits the user 15 to send an away message upon receipt of a communication.

Figure 2:
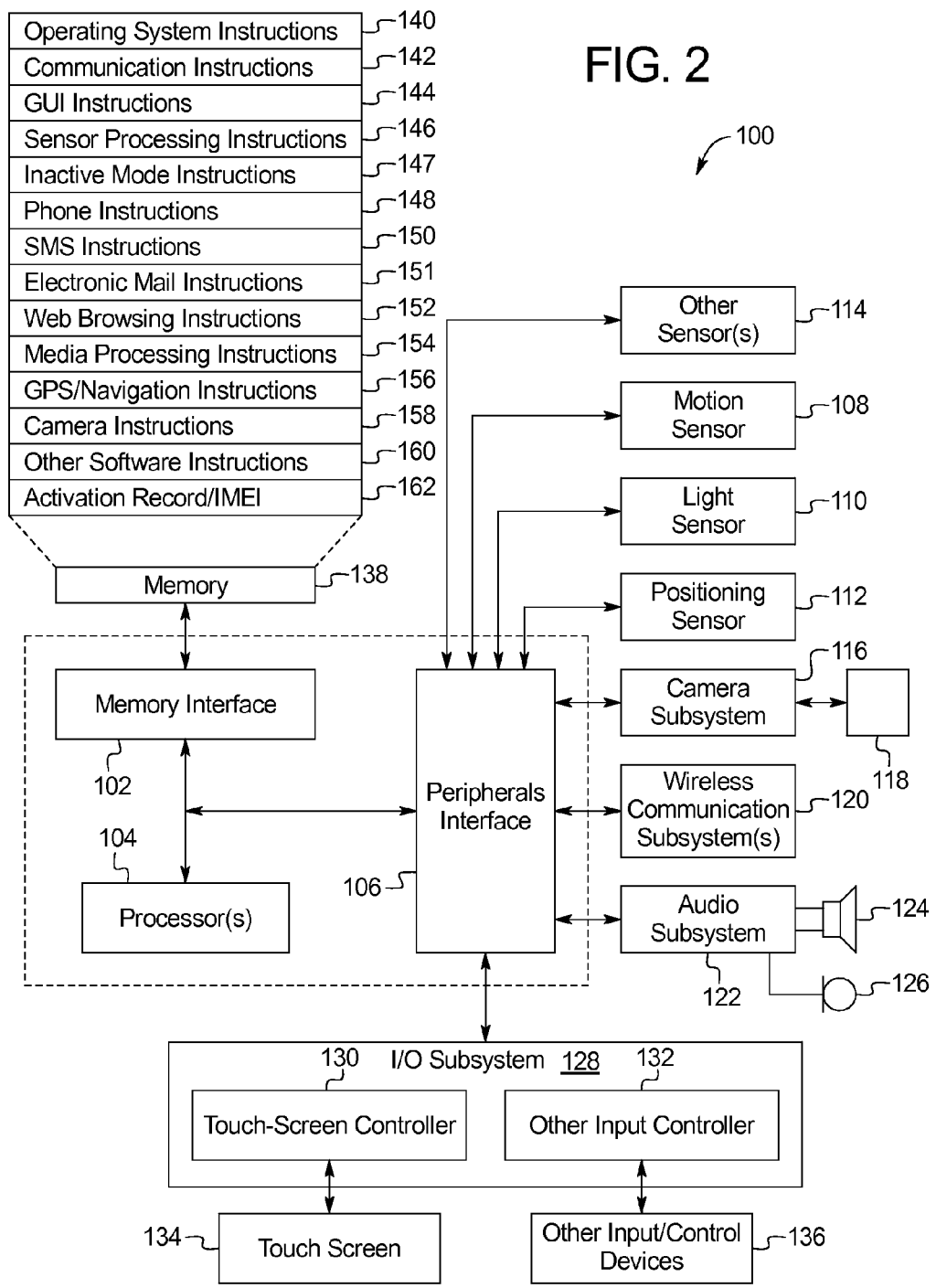
FIG. 2 is a diagram of an example of a device including functionality for suppressing communications to a user using an inactive mode and verifying that a user was not receiving communications during a particular period of time.

FIG. 2 is a block diagram of an example implementation of a mobile device 100 including an inactive mode. The mobile device 100 includes communication functions that can be facilitated through one or more wireless communication subsystems 120, which can include radio frequency receivers and transmitters and/or optical (e.g., infrared) receivers and transmitters. The specific design and implementation of the communication subsystem 120 can depend on the communication network(s) over which the mobile device 100 is intended to operate. For example, the mobile device 100 can include communication subsystems 120 designed to operate over a GSM network, a GPRS network, an EDGE network, a Wi-Fi or WiMax network, and a Bluetooth network. In particular, the wireless communication subsystems 120 may include hosting protocols such that the mobile device 100 may be configured as a base station for other wireless devices.

A memory 138 may store communication instructions 142 to facilitate communicating with one or more additional devices, one or more computers and/or one or more servers. The memory 138 may include phone instructions 148 to facilitate phone-related processes and functions; short message service instructions 150 to facilitate SMS-messaging related processes and functions; electronic mail instructions 151 to facilitate electronic-mail processes and functions. The phone instruction 148, the short message service instructions 150, electronic mail instructions 151 may include default instructions to notify a user via sound, visual, or vibration cues to alert the user of incoming communications. The memory may further include inactive mode instructions 147 to suppress the sound, visual, or vibration communication cues and manage the inactive mode related processes and functions further described herein.

Figure 3:
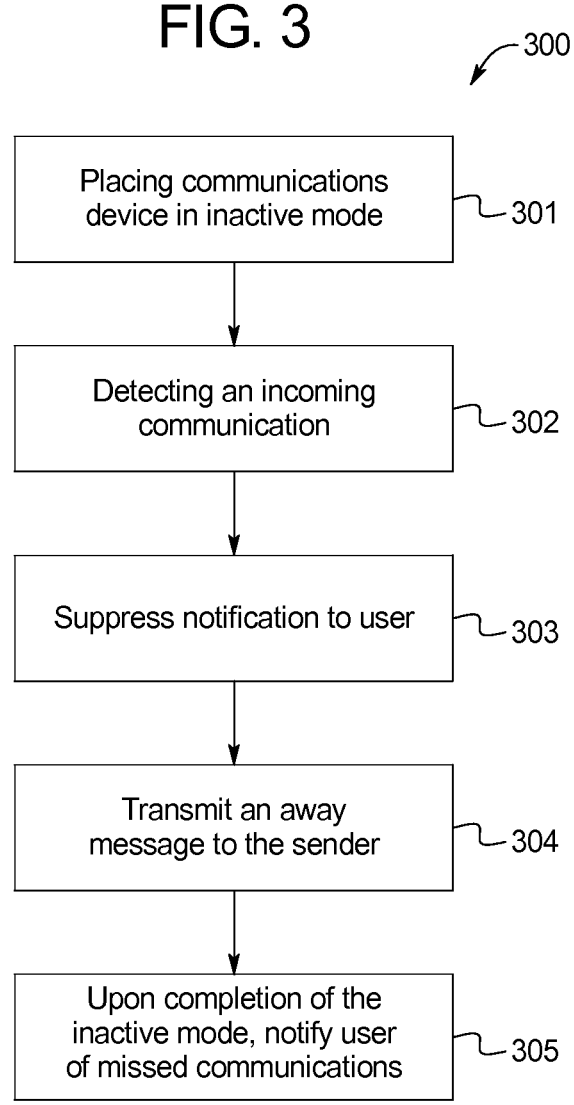
FIG. 3 is a flow chart illustrating a method carried out by a mobile device to provide for an inactive mode.

Turning to FIG. 3, in an embodiment, a method 300 carried out by a mobile device 100 to provide for an inactive mode includes: the step 301 of placing the mobile device 100 in inactive mode; the step 302 of detecting one or more incoming communications; the step 303 of suppressing notification of the user 15 of the one or more incoming communications; the step 304 of transmitting an away message to one or more senders 17 of the one or more communications; and the step 305 of notifying the user 15 of missed communications upon completion of the inactive mode.

Figure 4B:
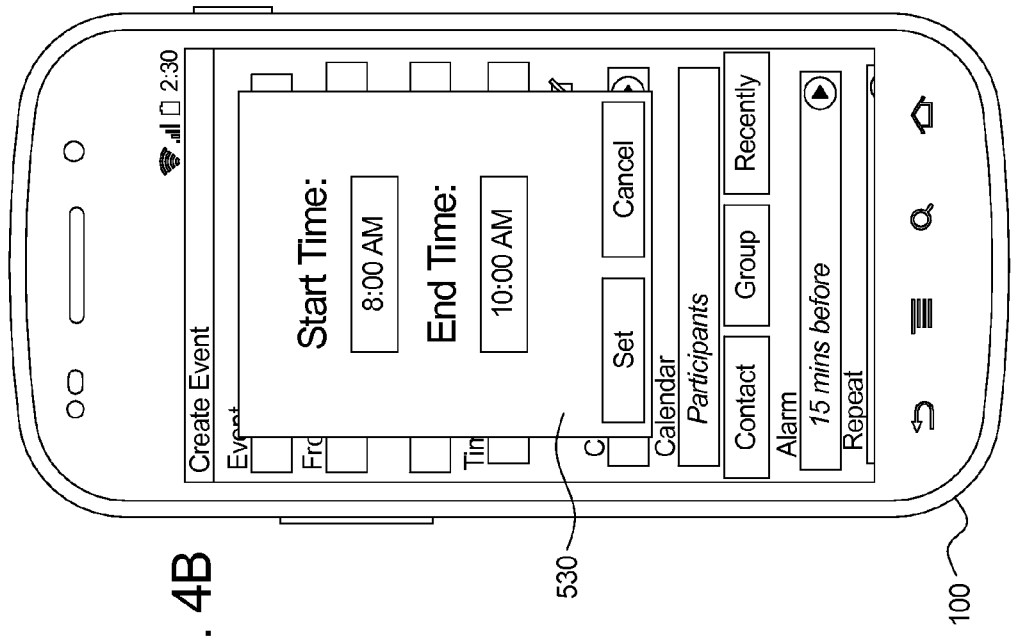
FIG. 4b is an example mobile device user interface showing a scheduling screen to schedule a time period during which the mobile device is automatically in inactive mode.
Figure 4A:
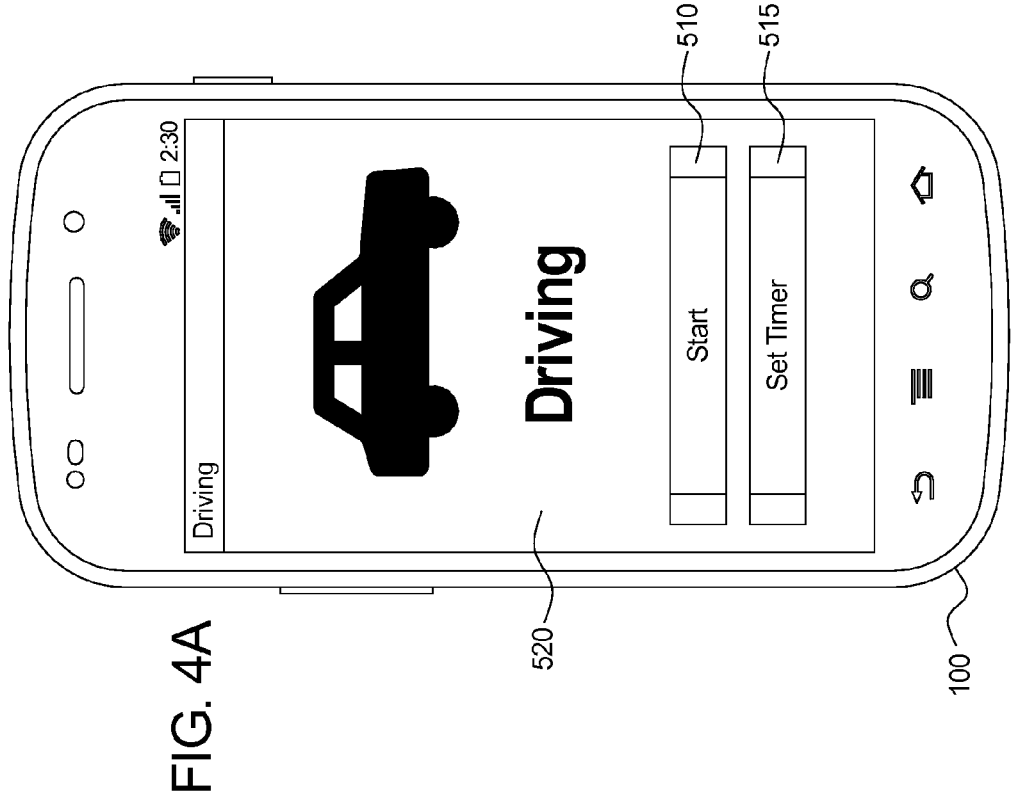
FIG. 4a is an example mobile device user interface showing a start screen used to begin the inactive mode.
Figure 4D:
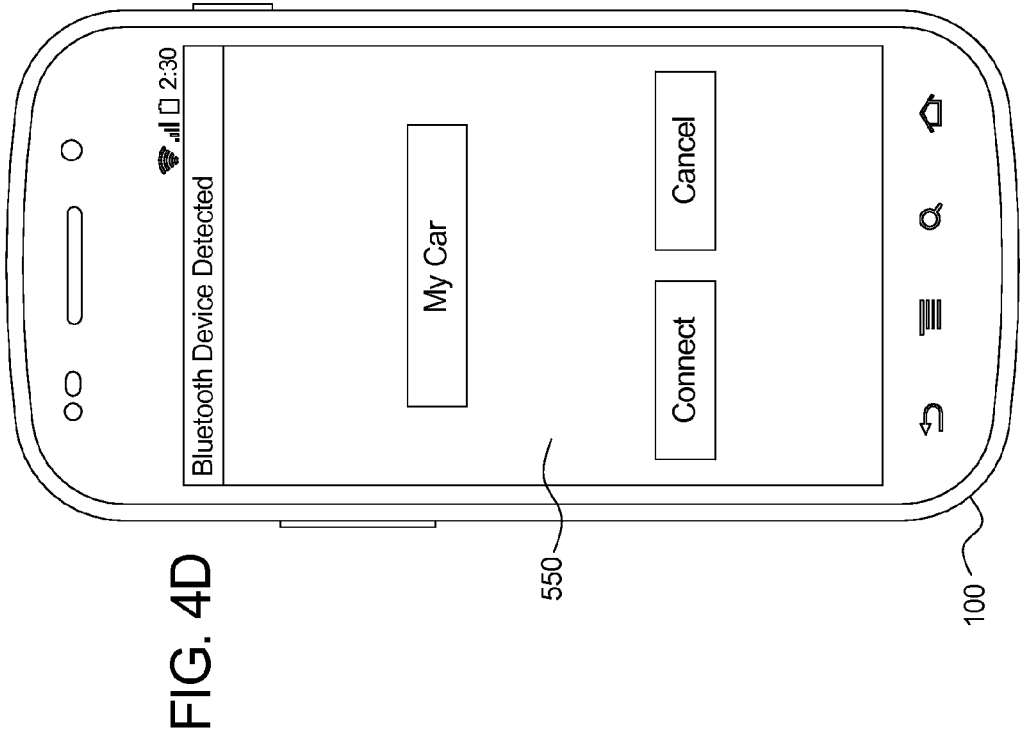
FIG. 4d is a front view of a mobile device user interface showing a Bluetooth device detection screen that when used to accept a Bluetooth connection may trigger the inactive mode.
Figure 4C:
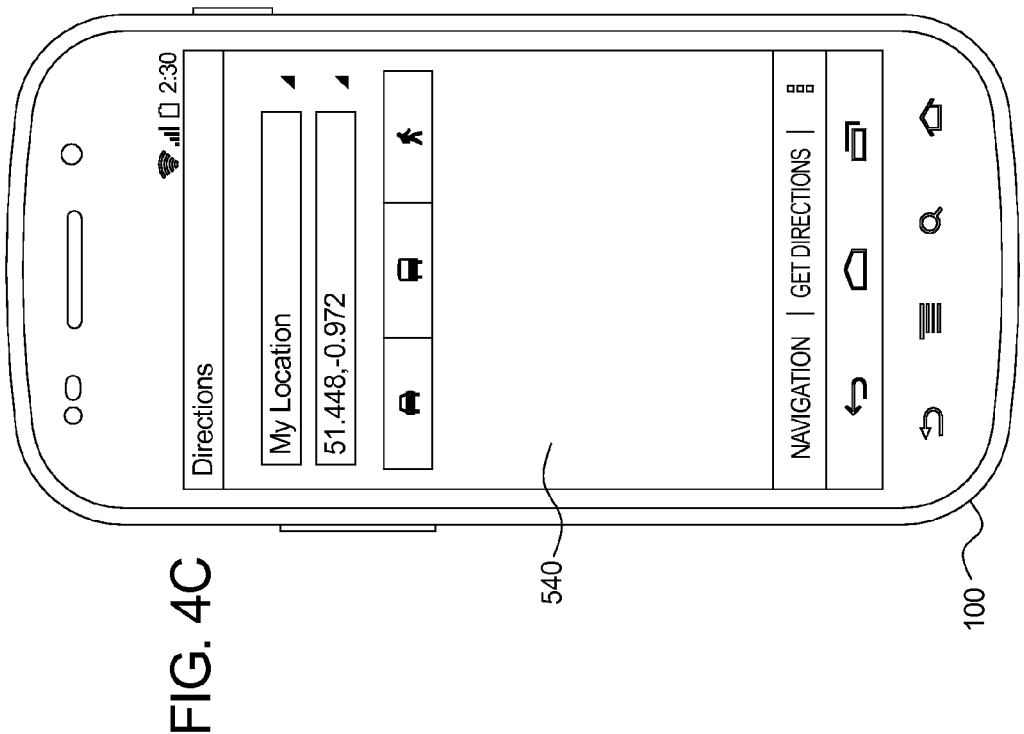
FIG. 4c is an example mobile device user interface showing a GPS/directions screen that when opened may trigger the inactive mode.

The method 300 begins at step 301 when the mobile device 100 is placed in inactive mode. Inactive mode may be activated by many different mechanisms. For example, as shown in FIG. 4a, a user 15 may press a start button 510 on a start screen 520 to begin the inactive mode. Alternatively, a user 15 may select the set timer button 515 on the start screen 515 to enter a scheduling screen 530, as shown in FIG. 4b, to schedule a time period during which the mobile device 100 is automatically in inactive mode. Even further, as shown in FIG. 4c, the inactive mode may be automatically initiated upon the opening of a GPS/directions screen 540 of the mobile device. Yet even further, as shown in FIG. 4d, the inactive mode may be automatically initiated upon the pairing of the mobile device 100 and a vehicle, as shown by the Bluetooth device detection screen 550. Moreover, the inactive mode may be activated by a remote user 15, for example, to enable parents to limit distracted driving by teenagers. Additionally, the inactive mode may be activated by the mobile device 100 detecting a particular location using GPS, such as a gym or school, where inactive mode is routinely activated. It is contemplated that any input that may indicate that the user is not to be distracted may be used to place the device in inactive mode, as will be understood by those of skill in the art.

Once placed in inactive mode, at step 302, the mobile device 100 will detect any incoming communications normally. When inactive mode functionality is provided as a mobile application, upon entering inactive mode the mobile application may register with the operating system of the mobile device 100 to receive a notification upon a communication event, such as a mobile call, SMS message, or email. Upon receipt of notification of the incoming communication, the mobile application may capture contact information of the sender 17, such as phone number or email address.

Proceeding to step 303, upon receiving notification of an incoming communication, the mobile device 100 may suppress normal user notification. The mobile device 100 may suppress normal user notification actions, such as ringing, vibration, and screen activation. Further the mobile device 100 may suppress applications normally launched upon a communication event, such as a mobile call application. In some embodiments, the mobile device 100 may permit normal user notification if the sender 17 is on a pre-screened list of allowed senders 17.

Figure 5B:
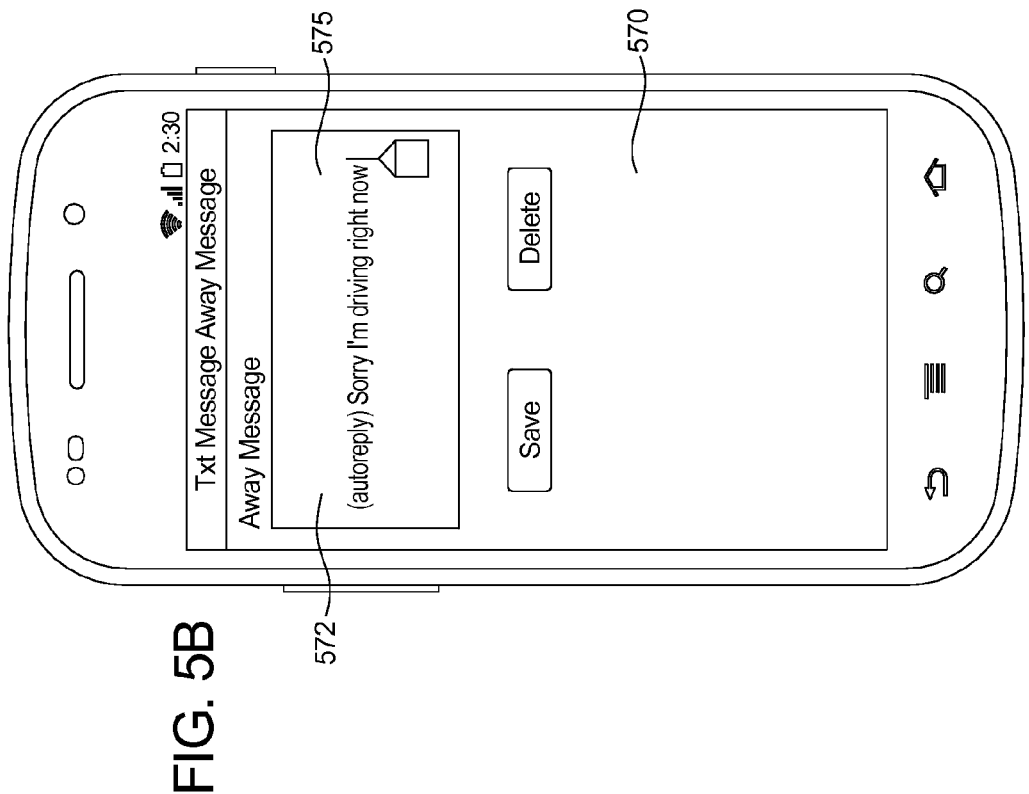
FIG. 5b is an example mobile device user interface showing a custom message creation screen.
Figure 5A:
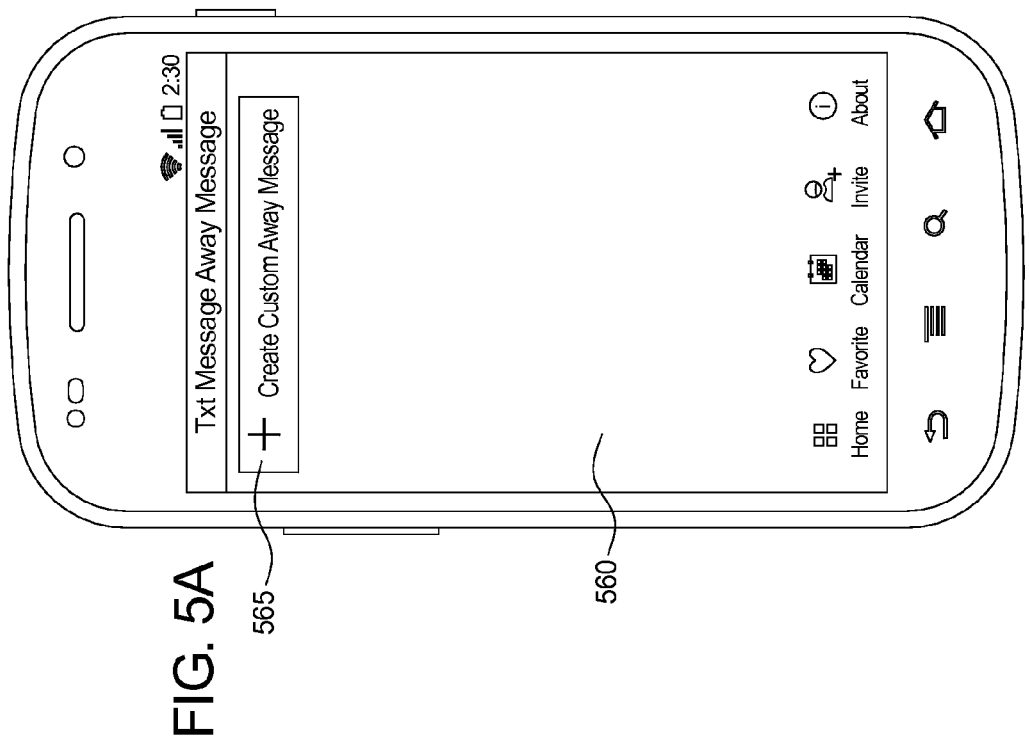
FIG. 5a is an example mobile device user interface showing a custom message selection screen.
Figure 5D:
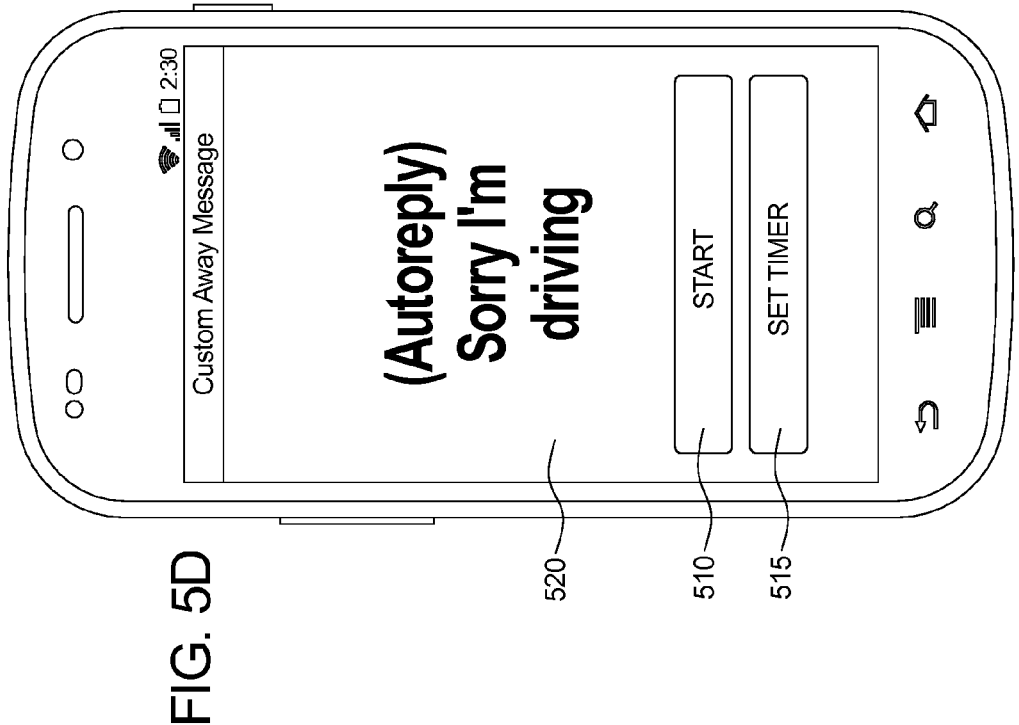
FIG. 5d is an example mobile device user interface showing a start screen that includes a custom away message.
Figure 5C:
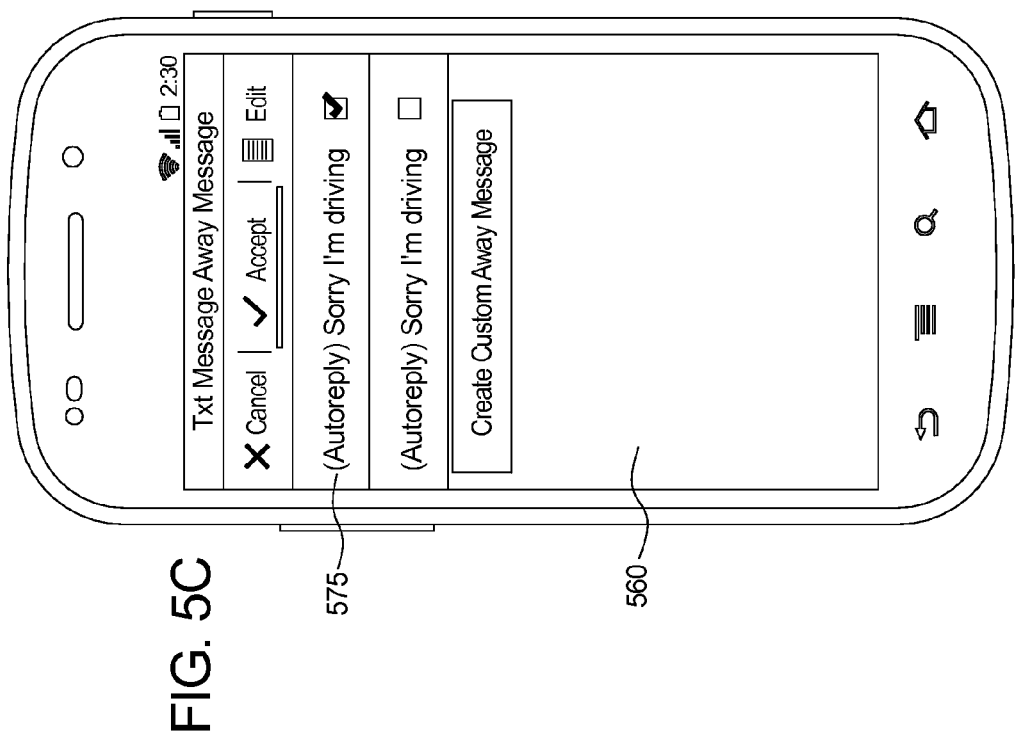
FIG. 5c is an example mobile device user interface showing a custom message selection screen including example away messages.

After suppressing user notification of an incoming communication, the mobile device 100, at step 304 of the method 300, may transmit an away message 575 to the sender 17. The user 15 may configure multiple away messages 575 and choose among the away messages 575 when placing the mobile device 100 in away mode. As shown in FIGS. 5a-5d, the user 15 may configure an away message before placing the mobile device 100 in inactive mode. FIG. 5a illustrates an away message selection screen 560 before the user 15 has set up an away message 575. A user 15 may select the away message creation button 565 to enter an away message editing screen 570 including an edit box 572, as shown in FIG. 5b. After creating away messages 575, the user 15 may select from the away messages 575 tin the away message selection screen 560 as shown in FIG. 5c. Upon selecting an away message 575, the start screen 520 is opened permitting the user to start the inactive mode. It is further contemplated that the away message 575 may be automatically shared to social networks such Facebook and Twitter upon activation of the inactive mode.

In some embodiments, the away message 575 may be sent via the same communications medium in which the original communication was made. For example, if a text message was received, the mobile device 100 may transmit the away message 575 via text message. Alternatively, the away message 575 may be sent by a different communications medium. For example, if a phone call was received, the mobile device 100 may transmit the away message 575 via text message or email.

Figure 6:
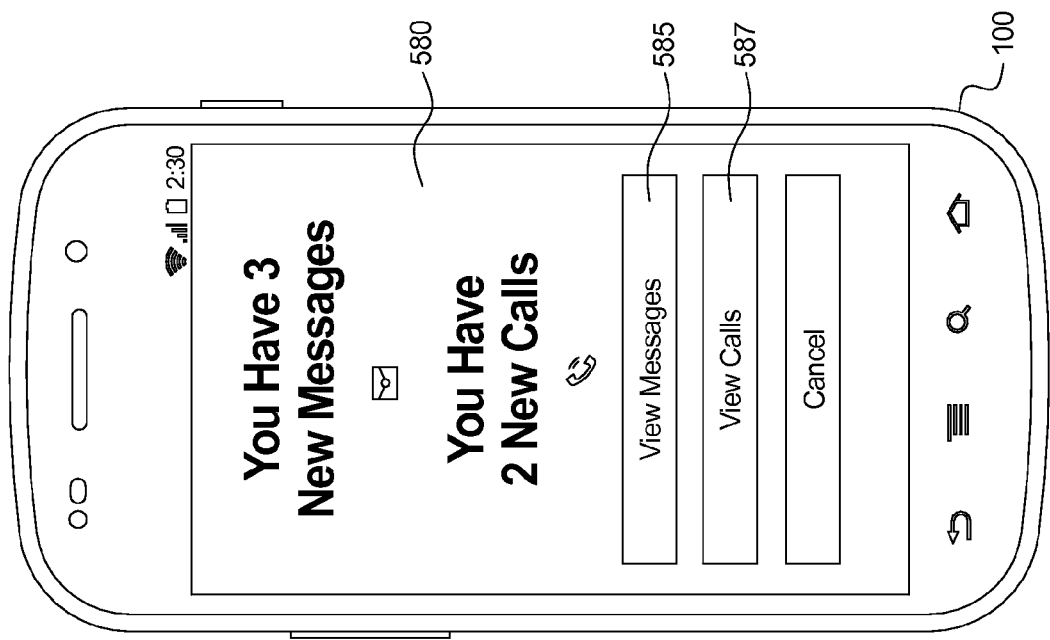
FIG. 6 is an example mobile device user interface showing a notification screen displayed upon leaving inactive mode.
Figure 7:
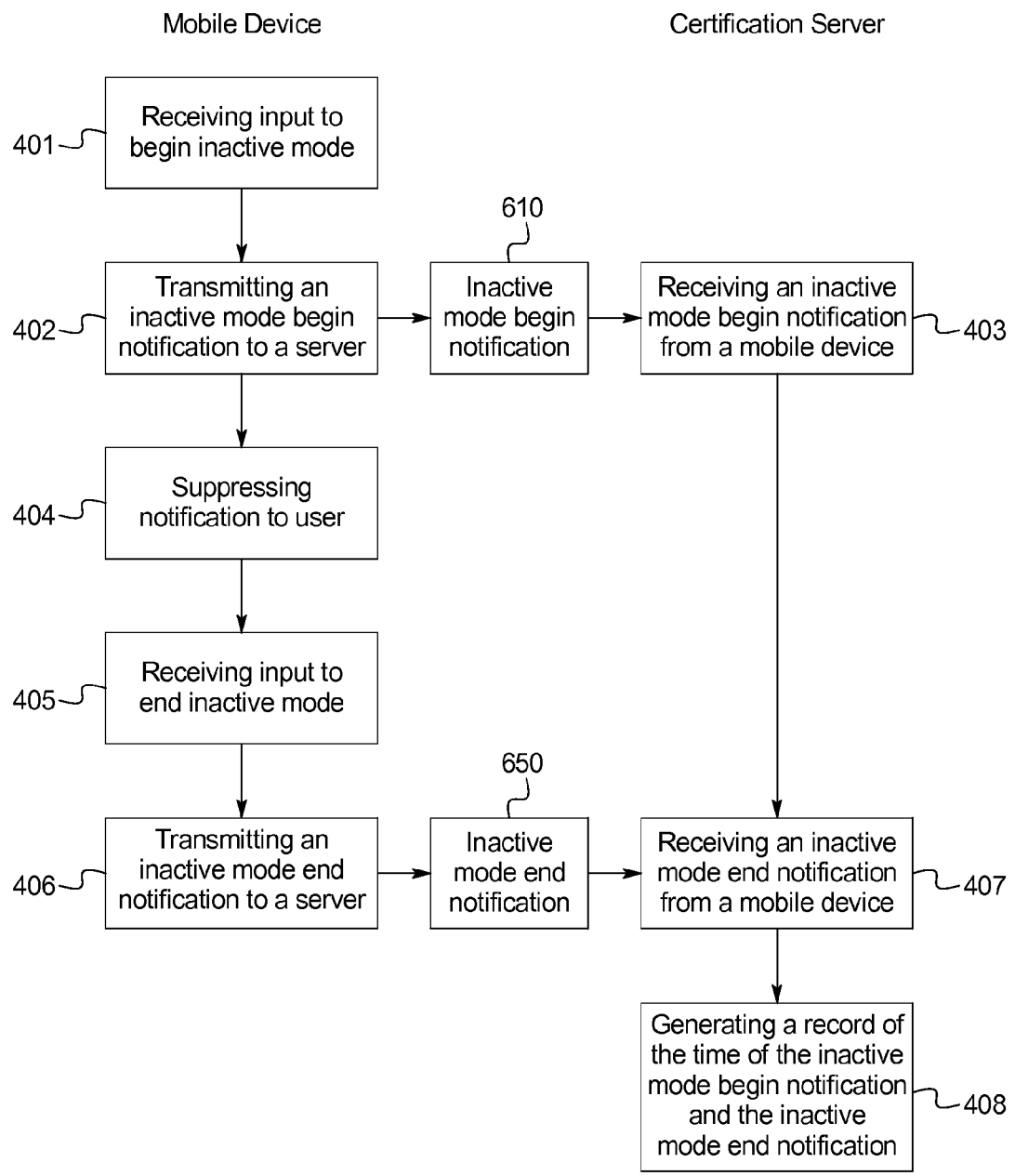
FIG. 7 is a flow chart illustrating a certification method to create a certified record at the certification server that a mobile device was inactive during a particular time.

Upon completion of the inactive mode, next at step 305, the mobile device 100 notifies the user 15 of missed communications. At the missed communications screen 580 shown in FIG. 6, the user 15 may then view any text messages or emails by clicking the view message button 585, listen to voicemails left by the sender 17 by clicking the view calls button 587, or otherwise use the full functionality of the device. In an embodiment, inactive mode may be disabled by pressing a button ending inactive mode. Alternatively, where inactive mode was scheduled to start automatically, the mobile device 100 may leave inactive mode by reaching the end of a scheduled time. Further, where the mobile device 100 was placed in inactive mode by the driving directions functionality, the mobile device 100 may leave inactive mode by arriving at a destination. Even further, where the mobile device 100 was placed in inactive mode remotely, the mobile device 100 may be removed from inactive mode by remote deactivation. It will be apparent to one of skill in the art that that the mobile device 100 may be removed from inactive mode by any mechanism that reflects that the need for restricted access is no longer needed.

In addition to suppressing communications, inactive mode may restrict the user's use of the mobile device. For example, the user 15 of the mobile device 100 may be restricted from accessing a web browser, applications, communications programs, etc. Inactive mode may restrict all use of the mobile device 100 or may permit only selective access to certain functionality. For example, when driving, mapping and GPS/navigation functionality may remain accessible.

It is contemplated that the user 15 may customize the allowed functionality during inactive mode. Alternatively or additionally, the restriction on the functionality may be pre-programmed in the inactive mode instructions 147. For example, if the inactive mode functionality of the mobile device 100 is embodied in a mobile application distributed by an insurance company, the restriction of functionality may be optimized to minimize distracted driving accidents. Further, a remote user may restrict the functionality of the mobile device 100. For example, a parent may limit a child's use of a mobile device 100 during nighttime sleeping hours.

Referring to FIG. 4, the certification method 400 may be used to create a certified record 670 (FIG. 6c) by the certification server 30 that records that a mobile device 100 was inactive during a particular time. As shown in FIG. 4, the certification method 400 includes: the step 401 of receiving an input by the mobile device 100 to begin the inactive mode; the step 402 of transmitting an inactive mode begin notification 610 from the mobile device 100 to the certification server 30; the step 403 of receiving, by the certification server 30, an inactive mode begin notification 610; the step 404 of suppressing notifications to a user 15; the step 405 of receiving an input by the mobile device 100 to end the inactive mode; the step 406 of transmitting an inactive mode end notification 650 from the mobile device 100 to the certification server 30; the step 407 of receiving an inactive mode end notification 650 by the certification server 30; the step 408 of generating, by the certification server 30, a certified record 670 of the time of the inactive mode begin notification 610 and the inactive mode end notification 650.

The certification method 400 may begin upon the step 401 of the mobile device 100 receiving an input to begin the inactive mode. For example, as shown in FIG. 4a, a user 15 may press a start button 510 on a start screen 520 to begin the inactive mode. Alternatively, a user 15 may select the set timer button 515 on the start screen 515 to enter a scheduling screen 530, as shown in FIG. 4b, to schedule a time period during which the mobile device 100 is automatically in inactive mode. Even further, as shown in FIG. 4c, the inactive mode may be automatically initiated upon the opening of a GPS/directions screen 540 of the mobile device. Yet even further, as shown in FIG. 4d, the inactive mode may be automatically initiated upon the pairing of the mobile device 100 and a vehicle, as shown by the Bluetooth device detection screen 550. Moreover, the inactive mode may be activated by a remote user 15, for example, to enable parents to limit distracted driving by teenagers. It is contemplated that any input that may indicate that the user is not to be distracted may be used to place the device in inactive mode, as will be understood by those of skill in the art.

Figure 8A:
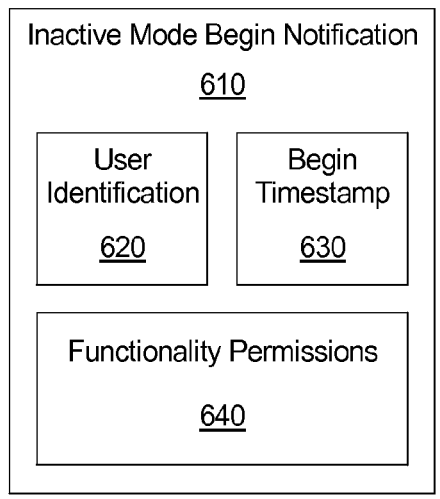
FIG. 8a is a diagram of an example inactive mode begin notification created during the execution of the certification method of FIG. 7.

Upon being placed in inactive mode, at step 402 the mobile device 100 may transmit an inactive mode begin notification 610 to the certification server 30. As shown in FIG. 8a, the inactive mode begin notification 610 may include a user identifier 620, and a begin timestamp 630 indicating the time that the inactive mode was initiated. Further, the inactive mode begin notification 610 may include a listing of functionality permissions 640 to record the functionality made available and/or the functionality made restricted to the user during the inactive mode. It is contemplated that the mobile device 100 need not immediately transmit the inactive mode begin notification 610 upon the step 401 of receiving an input to begin inactive mode is received, and the mobile device 100 may alternatively transmit the inactive mode begin notification 610 when requested, when a connection is available, during periods of low bandwidth utilization, or any other time useful to create the certification.

Figure 8B:
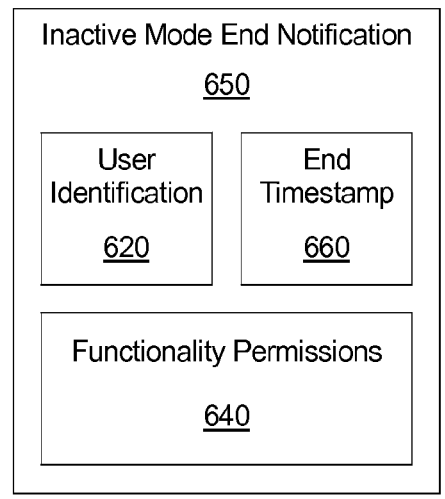
FIG. 8b is a diagram of an example inactive mode end notification created during the execution of the certification method of FIG. 7.
Figure 8C:
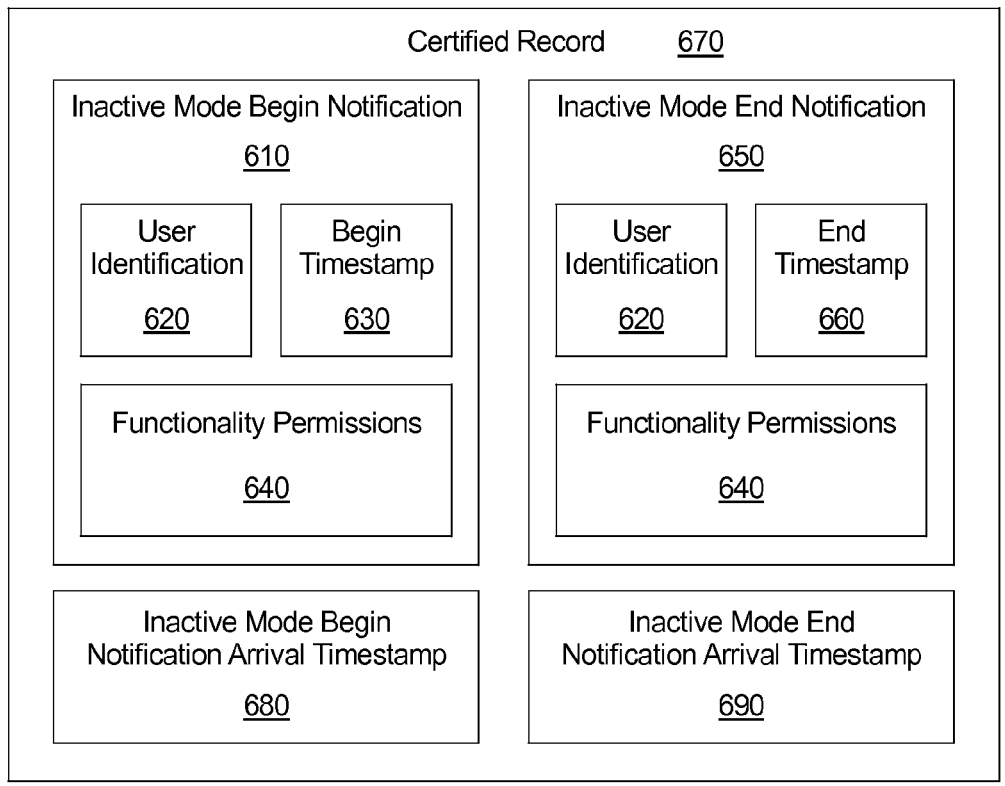
FIG. 8c is a diagram of an example record of an inactive mode session created during the execution of the certification method of FIG. 7.

At step 403, the certification server 30 may receive an inactive mode begin notification 610. The certification server 30 may assume that inactive mode is operating continuously until receiving a signal, such as an inactive mode end notification 650 (FIG. 8b), that inactive mode has been disabled. A certified record 670 of the data contained in the inactive mode begin notification 610 may be created and stored in a database of the certification server 30. As shown in FIG. 8c, the certified record 670 may include a first timestamp 680 of the time the inactive mode begin notification 610 was received.

At step 404, the mobile device 100 may suppress communications and enforce the restrictions of the inactive mode until the step 405 of receiving an input to end inactive mode. As previously described, an input may be the user pressing a button to end the inactive mode, the user scheduling a time period during which the mobile device 100 is automatically in inactive mode, the use of the driving directions functionality of the mobile device 100, activation by a remote user; etc.

At step 406, the mobile device 100 may transmit an inactive mode end notification 650 to the certification server 30 to indicate that the device 100 has left the inactive mode. The inactive mode end notification 650 may include a user identifier and a end timestamp 660 marking the time that the mobile device was removed from inactive mode. Further, the inactive mode end notification 650 may include a listing of functionality permissions 640 to record the functionality made available and/or the functionality made restricted to the user 15 during the inactive mode. It is contemplated that the mobile device 100 need not immediately transmit the inactive mode end notification 650 upon the step 405 of receiving an input to begin inactive mode is received, and the mobile device 100 may transmit the inactive mode end notification 650 when requested, when a connection is available, during periods of low bandwidth utilization, or any other time useful to create the certification.

At step 407, the certification server 30 may receive an inactive mode end notification 650. Upon receipt of the inactive mode end notification 650, the certification server 30 may make a certified record 670 of the inactive mode session. The certified record 670 of the inactive mode session may include the inactive mode begin notification 610, an inactive mode begin notification arrival timestamp 680 recording the arrival of the inactive mode begin notification 610, the inactive mode end notification 650, and an inactive mode end notification arrival timestamp 690 recording the arrival of the inactive mode end notification 650. In some embodiments, the certified record 670 may further include a GPS location trace of the mobile device 100 while the mobile device was in inactive mode. By storing a GPS location trace in the certified record, the user may, among other things, provide proof of location during inactive mode, as may be useful when an accident has occurred. The certified record 670 may be used to verify that the inactive mode was enabled during a period of time. To do so, the record may be made available via a user interface to the user 15, an insurance company, the police, the courts, a parent of the user 15, etc., to certify the times the device was in inactive mode and the restrictions on functionality in place during inactive mode.

Referring back to FIG. 2, the mobile device 100 includes a memory interface 102, one or more data processors, image processors and/or central processors 104, and a peripherals interface 106. The memory interface 102, the one or more processors 104 and/or the peripherals interface 106 can be separate components or can be integrated in one or more integrated circuits. The various components in the mobile device 100 can be coupled by one or more communication buses or signal lines, as will be recognized by those skilled in the art.

Sensors, devices, and additional subsystems can be coupled to the peripherals interface 106 to facilitate various functionalities. For example, a motion sensor 108 (e.g., a gyroscope), a light sensor 110, and a positioning sensor 112 (e.g., GPS receiver) can be coupled to the peripherals interface 106 to facilitate the orientation, lighting, and positioning functions described further herein. Other sensors 114 can also be connected to the peripherals interface 106, such as a proximity sensor, a temperature sensor, a biometric sensor, or other sensing device, to facilitate related functionalities.

A camera subsystem 116 and an optical sensor 118 (e.g., a charged coupled device (CCD) or a complementary metal-oxide semiconductor (CMOS) optical sensor) can be utilized to facilitate camera functions, such as recording photographs and video clips.

An audio subsystem 122 can be coupled to a speaker 124 and a microphone 126 to facilitate voice-enabled functions, such as voice recognition, voice replication, digital recording, and telephony functions.

The I/O subsystem 128 can include a touch screen controller 130 and/or other input controller(s) 132. The touch-screen controller 130 can be coupled to a touch screen 134. The touch screen 134 and touch screen controller 130 can, for example, detect contact and movement, or break thereof, using any of a plurality of touch sensitivity technologies, including but not limited to capacitive, resistive, infrared, and surface acoustic wave technologies, as well as other proximity sensor arrays or other elements for determining one or more points of contact with the touch screen 134. The other input controller(s) 132 can be coupled to other input/control devices 136, such as one or more buttons, rocker switches, thumb-wheel, infrared port, USB port, and/or a pointer device such as a stylus. The one or more buttons (not shown) can include an up/down button for volume control of the speaker 124 and/or the microphone 126.

The memory interface 102 can be coupled to memory 138. The memory 138 can include high-speed random access memory and/or non-volatile memory, such as one or more magnetic disk storage devices, one or more optical storage devices, and/or flash memory (e.g., NAND, NOR). The memory 138 can store operating system instructions 140, such as Darwin, RTXC, LINUX, UNIX, OS X, iOS, WINDOWS, or an embedded operating system such as VxWorks. The operating system instructions 140 may include instructions for handling basic system services and for performing hardware dependent tasks. In some implementations, the operating system instructions 140 can be a kernel (e.g., UNIX kernel).

The memory 138 may include graphical user interface instructions 144 to facilitate graphic user interface processing; sensor processing instructions 146 to facilitate sensor-related processing and functions; web browsing instructions 152 to facilitate web browsing-related processes and functions; media processing instructions 154 to facilitate media processing-related processes and functions; GPS/Navigation instructions 156 to facilitate GPS and navigation-related processes and instructions; camera instructions 158 to facilitate camera-related processes and functions; and/or other software instructions 160 to facilitate other processes and functions (e.g., access control management functions, etc.). The memory 138 may also store other software instructions (not shown) controlling other processes and functions of the mobile device 100 as will be recognized by those skilled in the art. In some implementations, the media processing instructions 154 are divided into audio processing instructions and video processing instructions to facilitate audio processing-related processes and functions and video processing-related processes and functions, respectively. An activation record and International Mobile Equipment Identity (IMEI) 162 or similar hardware identifier can also be stored in memory 138.

Each of the above identified instructions and applications can correspond to a set of instructions for performing one or more functions described herein. These instructions need not be implemented as separate software programs, procedures, or modules. The memory 138 can include additional instructions or fewer instructions. Furthermore, various functions of the mobile device 100 may be implemented in hardware and/or in software, including in one or more signal processing and/or application specific integrated circuits.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A mobile device, comprising:
a wireless communication module;
a processor, controlling the wireless communication module; and
a memory controlled by the processor, the memory including instructions that when executed by the processor cause the processor to perform the steps of:
providing a graphical user interface through which a user customizes one or more functions of the mobile device when placed in an inactive mode;
receiving a user selection to automatically initiate the inactive mode in response to the pairing of the mobile device with a vehicle;
receiving a user selection of an away message to use when the mobile device is in inactive mode;
in response to the pairing of the mobile device and the vehicle, automatically initiating a process to place the mobile device in inactive mode;
when the mobile device is in inactive mode, in response to receiving a communication from the wireless communication module, transmitting the user selected away message via the wireless module and suppressing one or more sound, visual, or vibration communication cues that would have accompanied the communication had the mobile device not been in inactive mode.

2. The mobile device of claim 1 wherein the memory further includes instructions that when executed by the processor cause it to perform the step of:
when the mobile device is in inactive mode, in response to receiving the communication from the wireless communication module, suppressing all sound, visual, and vibration communication cues that would have accompanied the communication had the mobile device not been in inactive mode.

3. The mobile device of claim 1 wherein the memory further includes instructions that when executed by the processor cause it to perform the step of:

provide a notification of the communications upon completion of the inactive mode.

4. The mobile device of claim 1 wherein the communication received from the wireless communication module is an SMS message.

5. The mobile device of claim 1 wherein the communication received from the wireless communication module is an email.

6. The mobile device of claim 1 wherein the communication received from the wireless communication module is a cellular phone call.

7. The mobile device of claim 1 wherein the user selected away message is a user customized away message.

8. The mobile device of claim 1 wherein the memory further includes instructions that when executed by the processor cause it to perform the step of:

when the mobile device is placed in inactive mode, provide a notification to a certification server that the mobile device is in inactive mode.

9. The mobile device of claim 8 wherein the memory further includes instructions that when executed by the processor cause it to perform the step of:

when the mobile device exits inactive mode, provide a notification to a certification server that the mobile device exited inactive mode.

\* \* \* \* \*